United States Patent
Samartsev et al.

(10) Patent No.: US 8,139,951 B2
(45) Date of Patent: Mar. 20, 2012

(54) FIBER-OPTIC LONG-HAUL TRANSMISSION SYSTEM

(76) Inventors: Igor Samartsev, Fryazino (RU);
Vladimir Antonenko, Fryazino (RU)

( * ) Notice: Subject to any disclaimer, the term of this patent is extended or adjusted under 35 U.S.C. 154(b) by 664 days.

(21) Appl. No.: 12/215,363

(22) Filed: Jun. 26, 2008

(65) Prior Publication Data

US 2009/0324233 A1    Dec. 31, 2009

(51) Int. Cl.
*H04B 10/08* (2006.01)
*H04B 10/16* (2006.01)

(52) U.S. Cl. ............. 398/181; 398/30; 398/33; 398/37; 398/157

(58) Field of Classification Search ............. 398/37–38, 398/157, 180–181, 30, 33, 94, 97
See application file for complete search history.

(56) References Cited

U.S. PATENT DOCUMENTS 7,031,051 B2 *  4/2006  Liu et al. ............ 359/341.2
7,174,108 B2 *  2/2007  Kamura ................. 398/181

* cited by examiner

*Primary Examiner* — Leslie Pascal

(57) ABSTRACT

An ultra-long fiber-optic transmission system is configured in accordance with the current telecom standards and particularly advantageous for transmission data at a long distance which may exceed 400 km between adjacent nodes. The disclosed system has at least one intermediate amplifying node provided with a supervisory optical channel (SOC) which carries information between spaced nodes about the multi-wavelength optical signal as well as remote conditions at the optical terminal or regeneration site. The SOC comprises a transponder operative to select the direction in which an optical supervisory signal OSS, carrying information about the fiber break and malfunction of WDM channels, is transmitted along the SOC. The transponder further includes a receiver operative to measure the power of incoming OSS signal, which is indicative of the power of the transmitted and amplified WDM signal, and a Raman controller. The latter is coupled to the receiver and operative to either turn or turn off a pump of Raman amplifier based on determination of whether the measured power is lower than or at least equal to a reference value. The transponder is further configured with a transmitter configured as a fiber laser which operates in at least two modes. In the first mode when the measured power as at least equal to the reference value, the fiber laser emits the OSS having a nominal power. In the second mode, when the measured power is less than the reference value, the transmitter is operative to lase the OSS having a greater than nominal power even if Raman and EDFA amplifiers of the amplification node are disabled. The utilization of the fiber laser enhances the reliability and control of the long fiber-haul system's operation.

20 Claims, 4 Drawing Sheets

Time, 2 ms/partition

FIBER-OPTIC LONG-HAUL TRANSMISSION SYSTEM

BACKGROUND OF THE DISCLOSURE

1. Field of the Disclosure

The invention relates to optical transmission systems and, particularly, to long-haul fiber-optic transmission systems.

2. Prior Art

As the complexity and power of optical communication systems increase, the demand for additional diagnostics and safety measures associated with the modern systems is being raised as well. It is rather customary that the power of optical signals transmitted through a fiber reaches the order of Watts. The moment there is a fiber break, which can happen due to a number of external and/or internal reasons, light is no more contained within the fiber and poses a safety hazard to field operators dealing with the maintenance of a transmission system at a variety of deployments. In case of a hazardous situation, it is imperative that the optical power be reduced to acceptable safe power levels and even completely shutdown and subsequently, upon remedying of the problem, controllably restored. The monitoring system recommended by ITU-T includes an optical supervisory channel (OSC) representing a particular interest for the scope of this disclosure. The OSC carries management information about the multiwavelength optical signal as well as remote conditions at the optical terminal or regeneration site, it is also used for remote software upgrades and user (i.e., network operator) Network Management information.

Some of the known earlier systems incorporate the OSC which is operative to run a battery of diagnostic tests while a transmission system is shut down. Accordingly, the service is interrupted which has far-reaching obvious negative consequences. Other known earlier systems are configured with the OSC associated with the STS-1 SONET standard (STM-1 SDH), which provides for a telephonic service line along the entire length of the transmission system. However, this kind of transmission systems can be effectively used only in a short-haul configuration and, thus, ineffective in a long-haul configuration, which is one of the targets of this disclosure.

Later developed long-haul systems overcome at least some of the above-discussed deficiencies by using the OSC operative to run a battery of diagnostic tests and transmit signals without interrupting the operation of information channels. This is attained by assigning the OSC a separate wavelength that does not interfere with wavelengths of respective information channels in Wavelength Division Multiplexing (WDM)- and Dense WDM (DWDM) transmission systems. Depending on the requirements applied to any given transmission system, the OSC signal is either an in-band or out-of-band signal. The OSC in-band signal propagates within the same band as WDM information signals, but in a different sub-band at wavelengths which rarely, if ever, are used for the WDM signals. In contrast, the out-of-band signal has a wavelength lying beyond the band of interest. In either case, the wavelength of the OSC is selected close enough to the WDM wavelengths to monitor the events leading to the malfunction of the transmission system.

The OSC is typically configured with a transmitter-responder or transponder including optical receiving and transmitting means for communication of data between at least two terminals on the OSC channel. The receiving means may comprise a filter means configured to remove information channels and select the SC, as well as to receive communication data transmitted on OSC. The transmitting means consists of a solid-state laser operating at the OSC wavelength. Both the receiving and transmitting means are coupled to a control means for controlling at least one operational parameter of an optical amplifier and adding communication data therefrom to the OSC.

The OSC can be incorporated, for example, in a short-haul fiber-optic transmission system. Such a system is disclosed in U.S. Pat. No. 7,327,960 and includes a transponder which has a receiver receiving an optical security or supervisory signal (OSS) circulating in the OSC and a solid state transmitter transmitting the OSS at short and mid-range distances. The disclosed transmission system further has a low-power regenerative laser limiting the application of the transponder only to such short distances.

The above discussed limitation was partially overcome by a WDM fiber-optic transmission system utilizing Raman amplifiers spaced along a communication link between terminal nodes and disclosed, for example, in U.S. Pat. No. 7,340,164. The disclosed system is operative to transmit WDM signal between transmitting and receiving nodes in opposite directions via respective communication links. The links each include at least one Raman amplifier which is controllably pumped in response to a control signal generated by control means of a transponder which are coupled to the transponder's receiver. The OSC further includes a transmitting means configured with a solid state laser and operative to transmit communication data on the OSC between the terminals and optical amplifiers. However, the transmission systems configured with Raman amplifiers is not efficient at distances exceeding 150 km.

The efficiency of a long-haul transmission optical system has been improved by introducing an amplifying node which includes an erbium-doped fiber amplifier (EDFA) in addition to Raman amplifiers, as disclosed in US Publication No. 2006/0269287. The disclosed system is provided with a plurality of terminal and amplifying nodes spaced from one another at great distances. The OSC is configured with a receiver which is capable of detecting control data at a lower rate at which the Raman's pump is enabled, and a higher rate which is commenced when the higher power of a Raman amplified signal has been received. A controller and a solid-state laser/transmitter complete the OSC configuration. The utilization of a two-speed configuration of the OSC improves the optimization of data transmission.

However, the above-discussed transmission system is not cost-efficient. Also, in case of failure of both Raman and EDFA lasers, the transmittable data would be lost in both DWDM information and OSC channels, because, at the disclosed OSC rates, the signal would be lower than the detection threshold of the OSC's receiver. Furthermore, the presence of the solid state laser/transmitter of an OSC limits the flexibility of the known transmission systems because the wavelength of the OSS emitted by the laser/transmitter unlikely can be altered.

A need, therefore, exists for a long-haul fiber-optic transmission system overcoming the above-discussed limitations caused by the known transponders so as to reliably and safely transmit a security channel signal data over a distance exceeding 400 km between adjacent amplifying-terminal nodes, even if one or all of the amplifying nodes are completely inoperable.

A further need exists for an optical supervisory channel (OSC) provided with a transponder which is configured with a fiber laser transmitter.

Still a further need exists for a transponder incorporated in the OSC of the long-haul fiber-optic system and configured with a fiber laser/transmitter which outcomes a security optical signals having substantially a single transverse mode.

SUMMARY OF THE DISCLOSURE

These and other needs are met by a long-haul fiber-optic transmission system configured in accordance with the present disclosure. In particular, the long-haul transmission system, provided with adjacent amplifier nodes which are spaced apart at a distance exceeding 400 km, operates at a high level of reliability and safety.

The disclosed system provides for a transmission of WDM signals between transmitting and receiving terminals in opposite directions along separate fiber-optic links. Each of the fiber-optic links includes at least one regenerating unit or node comprising a combination of Raman and EDFA amplifiers and a transponder. The disclosed system is provided with an optical security channel (OSC) operative to transmit between the nodes an optical supervisory signal (OSS) which propagates outside the range of information WDM channels. The transponder comprises a receiver and a transmitter coupled to one another through a controller.

In accordance with one aspect of the disclosure, the transmitter is configured as a fiber laser, not as the solid-state laser typically utilized by the known prior art systems. The fiber laser of the present disclosure is efficient, easily controllable and reliable in use, and technologically compatible with fiber transmission links because of the same structure. The output power of such a laser modulated by a pump may reach about 100 mW, which substantially exceeds the power of the known solid state lasers of the known systems.

In accordance with a further aspect of the invention, the disclosed transmitter comprises a high power monomode laser arrangement able to launch light into a multimode fiber portion which is coupled to a monomode fiber portion so that no mode converters are needed since the fundamental spot-sizes of the respective fiber portions are matched. The laser arrangement is further provided with a laser cavity defined between spaced reflectors which are coupled to respective multimode and monomode fiber portions. The reflector, coupled to the monomode portion, is operative to reflect only the fundamental mode of both portions. The reflected light provides the feedback necessary to force substantially fundamental mode oscillation which enables stimulated emission in only the fundamental mode. One of ordinary skills in the laser art readily realizes that the use of a SM fiber laser vastly improves the quality of the transmitted light signal, whereas, the replacement of the reflectors adds the possibility of varying the wavelength of the OSS, if a need arises.

BRIEF DESCRIPTION OF THE DRAWINGS

The above and other features will be further discussed based on the following drawings.

SPECIFIC DESCRIPTION

Figure 1:
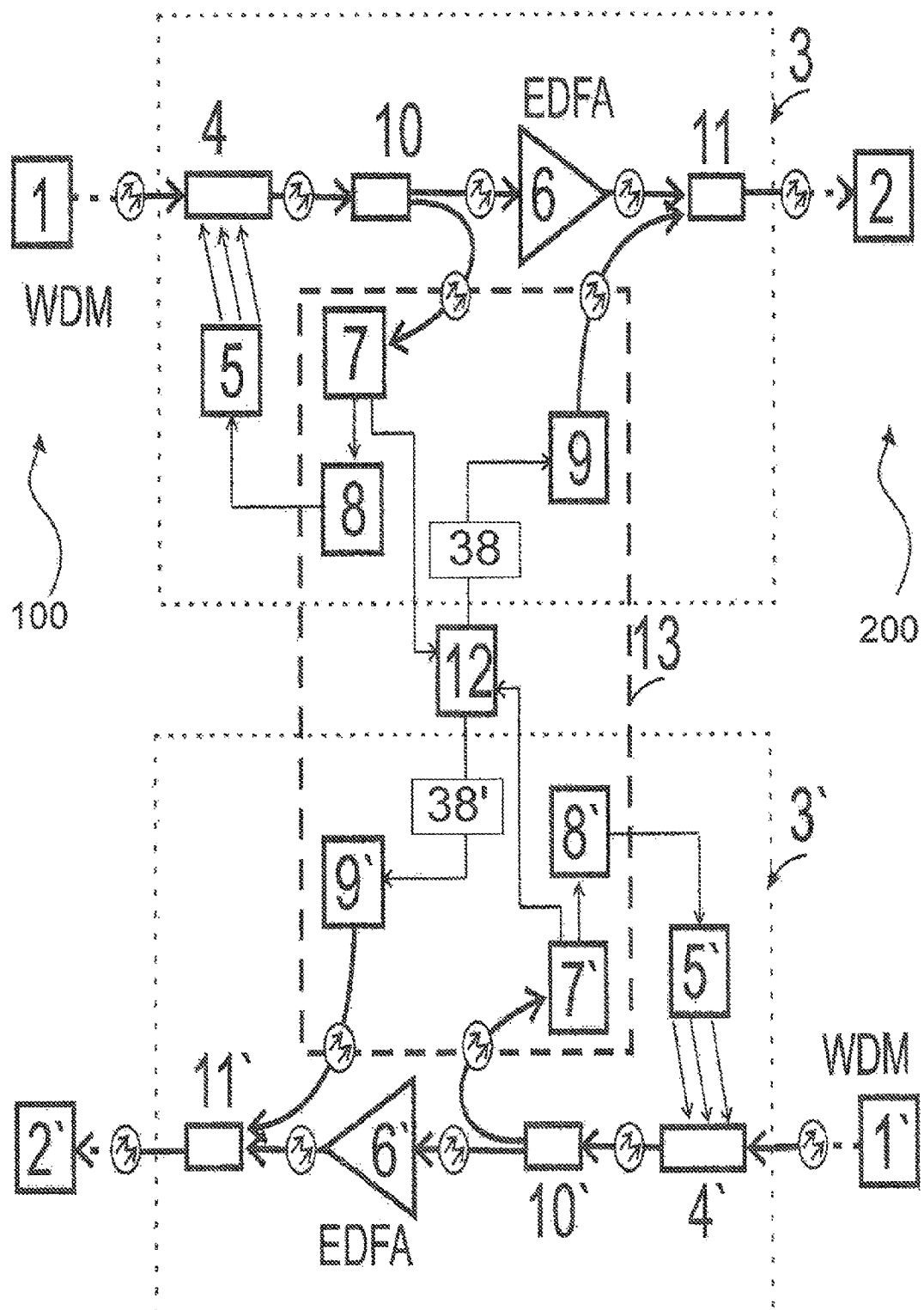
FIG. 1 is a highly diagrammatic view of a long-haul fiber-optic system configured in accordance with the present disclosure.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. The word "couple" and similar terms do not necessarily denote direct and immediate connections, but also include connections through intermediate elements or devices. Although the disclosure is discussed with respect to ultra-long-haul WDM and DWDM systems, all inventive aspects have application to other types of optical communication systems.

Referring to FIG. 1, the disclosed long-haul fiber-optic transmission/receiving system is configured with terminal nodes 100 and 200 and one or more amplifying nodes 3 located between the terminal nodes. The adjacent nodes are spaced form one another at hundreds of kilometers, for example, more than 400 km. The input of the disclosed system includes a number of information channels of data carried as laser light with each channel having a different wavelength.

The input signals are multiplexed together at terminal node 100 producing, thus, a wavelength division multiplex (WDM) signal. The WDM signal is transmitted in a first direction from terminal 100 to terminal 200 along a first optical fiber span 1-2. As the transmitted WDM signal propagates along a light path, it experiences unavoidable losses which are compensated in amplifying node 3. After the WDM signal is boosted in amplifying node 3, it is fed into the downstream optical fiber stretch guiding the WDM signal to next node, which may be, for example, terminal node 200 or another amplifying node. The received WDM signal is then de-multiplexed at terminal 200 into separate wavelengths, and the same process with subsequent steps of multiplexing, amplifying and de-multiplexing, respectively, is repeated in a second direction opposite the first one along a second optical fiber span 1'-2' between terminal nodes 200 and 100 via an amplifying node 3'.

The amplifying nodes 3, 3' include respective Raman amplifiers 4, 4' which are coupled to respective first 1-2 and second fiber 1'-2' spans. The gain medium in Raman amplifier 4, 4' is powered by input light from a Raman pump 5, 5' and generates output light at a wavelength, which is lower than the WDM signal. The laser output light is coupled into fiber span 1-2, 1'-2' (depending on the direction of the transmission) so that some of the energy from Raman 4, 4' is transferred to the WDM channels, thereby amplifying WDM signals.

The Raman amplification alone may be insufficient due to long fiber spans between adjacent nodes which may be spaced from one another at 400 km and more. Accordingly, amplifier nodes 3, 3' further include respective erbium doped fiber amplifiers (EDFA) 6, 6' coupled into first 1-2 and second 1'-2' fiber spans, respectively.

The disclosed transmission system further includes an optical supervisory channel (OSC) configured to provide data channels between nodes so as to allow the nodes to be monitored and controlled. The OSC is configured with a transponder 13 operative to generate and receive a optical supervisory/security signal (OSS) at a wavelength of sub-band different from the sub-band of the WDM signal. For instance, the OSS may be lased at a wavelength of about 1625 nm which is typically not used for the transmission of WDM signals centered about a 1550 nm wavelength.

The transponder 13 of the amplifying node of FIG. 1 is operative to receive the OSS signal, generated by the transponder of either one of the adjacent nodes and coupled into fiber span 1-2 or 1'-2' along with a WDM information signal, evaluate the received OSS, and modulate the power of Raman 4, 4' based on the evaluation. The OSS from the transponder of the adjacent node is coupled into the fiber span by means of an output coupler 11, 11' to the node shown in FIG. 1. The OSS at the output of the Raman amplifier including OSS is tapped off from the fiber span by a wavelength-dependent coupler 10, 10' and is further guided into transponder 13 where it is received by a receiving unit.

The receiving unit is configured to perform modulating the power of Raman pump coupleable into Raman amplifier 4, 4'; transmitting the received OSS to a central processing unit (CPU) 12 of transponder 13; and completely shutting down Raman 4, 4' in case of, for example, a fiber break until the latter is fixed.

To control the output power of Raman amplifier 4, 4', the receiving unit includes a receiver 7, 7' provided with a Raman pump controller 8, 8' which is operative to control the output of Raman amplifier 4, 4' in order to maintain the desired power of the transmitted WDM signal along the long-haul transmission line. The tapped-off OSS signal at the output of the Raman amplifier is, of course, indicative of the power of the WDM signal immediately downstream from Raman amplifier 4, 4'. If the measured power of the tapped-off OSS in controller 8, 8' is lower than a reference value, the controller outputs a control signal turning on pump 5, 5'. Conversely, if the power of the tapped off OSS signal is equal or greater than the reference value, controller 8, 8' generates the control signal turning off pump 5, 5. Accordingly, the power modulation of pump 5, 5' allows the power of transmitted WDM signals along the respective fiber spans to be at the desired level. While the above discloses a two-level power modulation, i.e., the first level corresponds to the measured power being below a reference value, and the second level corresponds to the measured power being at least equal to the desired reference value, clearly, multiple levels of power modulations of pump 5, 5 are easily attainable.

The tapped-off or coupled-off OSS is also received by CPU 12 executing software operative to process the OSS and, based on the measured magnitude thereof, control a pump of the transmitting unit of transponder 13. The transmitting unit, thus, has a transmitter 9, 9' and its pump 9".

In accordance with one of many salient features of the present disclosure, the transmitter 9, 9' includes a fiber laser. The fiber laser is easily controllable, capable of outputting a relatively powerful optical signal and easily adjustable to lase the light at different wavelengths.

If the tapped-off and processed OSS is at the desired level, pumps 38, 38' power respective transmitter's 9, 9' pump generates pump light causing transmitter 9, 9' to lase the OSS at nominal power. If the tapped-off and processed OSS is at the desired level, pumps 38, 38' power respective fiber lasers 9, 9' which, 38 the transmitter'pump 38 generates pump light causing transmitter 9, 9' to lase the OSS at nominal power. However, if the power of the processed OSS is lower than the desired threshold/reference value, the input current would be increased in order to output a more powerful pump light, which when coupled into fiber laser 9, 9', causes the latter to lase the OSS with a power higher than the nominal one. In either case, the generated OSS is again coupled into the fiber span downstream from EDFA 6, 6' of illustrated node and travels further along the transmission line to the next node where the above disclosed sequence is repeated.

If the tapped-off OSS indicates that both upstream RAMAN and EDF amplifiers are not operating at all, the utilization of fiber laser/transmitter 9, 9' gains a particular important role. Under this condition, the known solid state lasers would not be able to transmit the OSS at a distance of at least 400 km. In contrast, fiber laser 9, 9' of the disclosure is fully capable of reliably transmitting the OSS over this and greater distances. To realize such a transmission, software executed by CPU 12 is operative to increase fiber laser's 9, 9' output power to a maximum value, clock frequency up to 100 Hz and depth of modulation up to a maximum value, whereas the receiving unit should properly operate if the tapped-off has a power (Poss) of up to −90 dBm.

As to the rate of transmission of the OSS along the security channel, which includes at least a 400 km fiber span, it does not have to be high and is not the determining factor of the quality of the system. The high reliability of transmission and its reception are critical. The control of these critical parameters is attained by modulating electrical current of pump 38 emitting pump light which is coupled into fiber laser/transmitter 9, 9' so as to modulate the output power thereof. The adaptive structure of transducer 13 obviously allows for a substantial decrease in the output power of fiber laser 9, 9' and its modulation, if both the Raman and EDF amplifiers operate properly.

The CPU 12 of transponder 13 is provided with software capable of controlling fiber laser/transmitter 9, 9' so as to adjust the rate at which it transmits data in the supervisory channels between adjacent modes. Based on the above, CPU 12 executes a software adapted to controllably regulate the output power of fiber laser/transmitter 9, 9', the depth of modulation and rate of transmission in a manner well known to one of ordinary skills in the art.

The transponder 13 is coupled to both fiber spans 1-2 and 1'-2'. The single CPU 12, thus, executes a software operative to transmit the OSS in either direction depending on the circumstances. For instance, if there is a fiber cut in one of fiber spans 1-2 and 1'-2', the software executed by CPU 12 is operative to redirect the OSS so that it propagates along the other fiber span.

Figure 2:
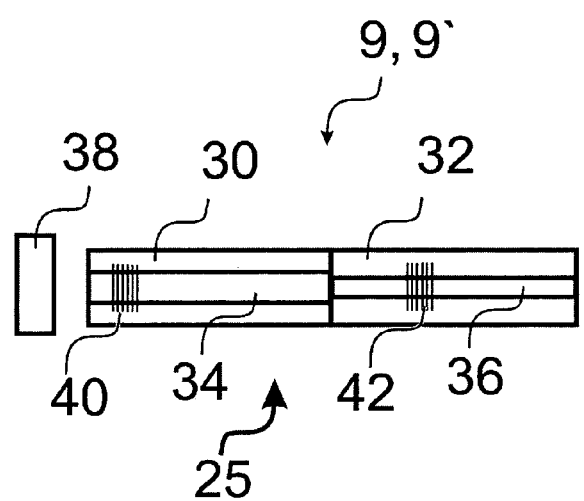
FIG. 2 is a diagrammatic view of one of possible modifications of fiber laser used in the transponder of the system of FIG. 1.

FIG. 2 illustrates one of configurations of fiber laser/transmitter 9, 9' disclosed in detail in U.S. Pat. Nos. 5,422,897 and 5,774,484, each of which is owned in its entirety by the Assignee of the present disclosure and fully incorporated herein by reference. As will be disclosed hereinbelow, this particular configuration, when incorporated in the OSC of FIG. 1, provides bright and powerful light.

Briefly, fiber laser 9, 9' is configured as a monomode laser arrangement 25 including high power laser diode array 38 and an active upstream fiber 30 having a multi-mode (MM) core 34 capable of supporting only a fundamental mode at the desired lasing wavelength, such as 1625 nm, and a substantially single mode (SM) downstream fiber 32 at the lasing wavelength which is fusion spliced to MM fiber 30. The cores 34, 36 of respective MM and SM fibers 30, 32 are selected so that the fundamental spot size of MM fiber 30 substantially matches that one of SM fiber 32. In other words, the core sizes are substantially uniform. Such a configuration allows for an efficient coupling of the fundamental modes of MM and SM fibers 30, 32, respectively, at the coupled ends of these fibers. A pump arrangement 38 including one or more powerful MM laser diodes lases pump light coupled into the MM fiber at a pump wavelength which is different from the desired lasing wavelength of the OSS. Finally, a reflector arrangement defining an optical cavity includes a strong reflector 40 and a weak reflector 42 provided in respective MM fiber 30 and SM fiber 32. The weak reflector 42 is configured to reflect only the fundamental mode of the MM and SM fibers and, thus, provides the feedback necessary to force predominantly fundamental mode oscillation in the optical cavity which enables laser arrangement 25 to emit light in only the fundamental mode.

The experimental data shows that the above-disclosed fiber laser/transmitter 9, 9' is easily controllable, reliable in use and technologically compatible with fiber spans of the disclosed system since it has the same configuration as the fiber spans. Furthermore, the lasing wavelength, such as a 1625 nm wavelength, propagates at the periphery of the window of transparency without exiting the WDM signal. The latter is particularly evident in the long wavelength region of the infrared spectrum of the window of transparency of fiber made from silica. Furthermore, in contrast to a solid state laser, it is easy to change a lasing wavelength, if a need exists, by replacing the existing reflectors with a pair of reflectors which operate at different wavelengths. Also, a tunable laser, well known to one of ordinary skills in the laser art may also be used in the context of this disclosure.

Figure 3:
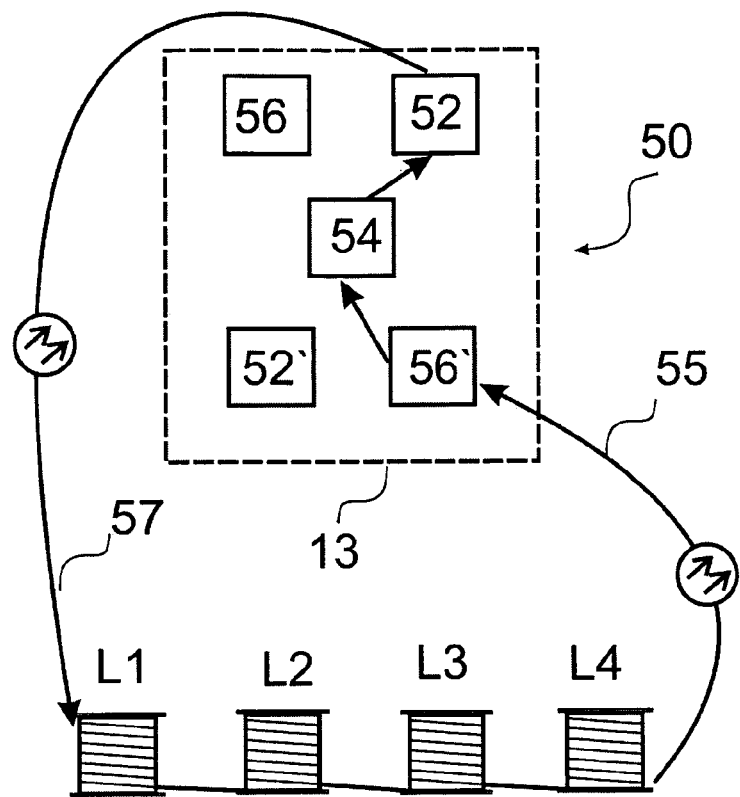
FIG. 3 is a highly diagrammatic view of an experimental device illustrating the operation of the system of FIG. 1.

FIG. 3 illustrates an experimental assembly 50 imitating a single 400 km fiber span of the communication system of FIG. 1 with the transponder of FIG. 2. The assembly 50 has sequentially energized four spools L1, L2, L3 and L4 each having a 100 km fiber haul. The assembly 50 represents the worse possible conditions which the disclosed system of FIG. 1 may experience, i.e. when both Raman and EDF amplifiers are out of order and, thus, not operating. The transponder 13 is configured as an optical module on a chip with two fiber spans 55, 57 transmitting data in opposite directions. The transmitter 52, 52' includes a fiber laser, such as the one shown in FIG. 2. The CPU 54 executes a software operative to control drivers of respective optoelectronic converter, fiber laser, and optoelectronic decoder and analyzed the received OSS carrying the SOC-related data. The receiver 56, 56' is configured with an optoelectronic converter, photodiode and decoder all known to one of ordinary skills in the art.

Figure 4:
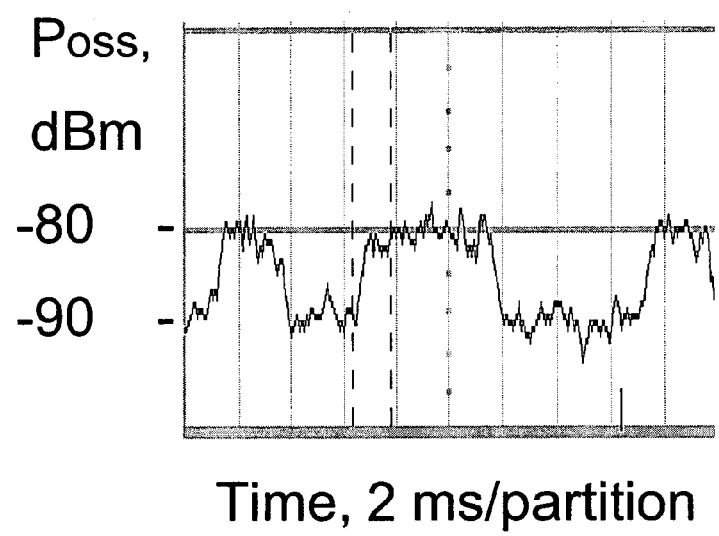
FIG. 4 is a graph illustrating the results of the operation of the device of FIG. 3.

FIG. 4 illustrates the result obtained during the operation of assembly 50 of FIG. 3 and in particular, a graph representing the power of the OSS received by receiver 56'. The assembly 50 is set to have transmitter 52 pumped with a modulator control signal which is determined by a 50% pump power depth of modulation. The transmitter 52 has an output power of about a 10 mW. The OSS is transmitted along a supervisory optical channel at a bit rate of 200 Hz. The graph indicates that the −80 dBm power OSS signal (Poss) is reliably received by receiver 56, 56'. Moreover, the graph clearly indicates that the receiver is fully capable of receiving a −90 dBm signal which, in turn, shows that the disclosed supervisory channel has about a 10 dB reserve of the output power of transmitter 52, 52'. Increasing the output power of transmitter 52, 52' at 10 dB adds extra 40 km to a 400 km fiber span.

It will be apparent to those skilled in the art that various modifications and variations can be made in the presently disclosed long-haul transmission fiber system. Thus, it is intended that the present disclosure cover the modifications and variations of this disclosure provided they come within the scope of the appended claims and their equivalents.

The invention claimed is:

1. A transponder comprising:
a receiving unit operative to receive an optical signal propagating along a transmission link;
a central processing unit (CPU) coupled to the receiving unit, the CPU executing software operative to determine whether a magnitude of the received optical signal is at least equal to a reference value or lower than the reference value; and
a transmitting unit coupled to the CPU and including a fiber laser, the fiber laser controllably generating an optical supervisory signal at a nominal power if the magnitude of the determined optical received signal is at least equal to the reference value, and with an increased power higher than the nominal power if the magnitude is lower than the reference value.

2. The transponder of claim 1, wherein the transmitting unit further includes a laser pump generating a pump light which is coupled into the fiber laser, a power of the pump light being modulated based on the controls signals from the CPU so that the fiber laser lases the optical supervisory signal having one of the nominal and increased powers and coupled into the transmission link.

3. The transponder of claim 1, wherein the fiber laser of the transmitting unit is configured with active and passive fibers coupled to one another, the active and passive fibers having respective multimode and single-mode cores, the MM and SM cores being mode-matched so as to support substantially a uniform single fundamental mode of the optical signal at a desired frequency.

4. The transponder of claim 3, wherein the fiber laser is further configured with two reflectors coupled to the respective active and passive fibers so as to define an optical cavity therebetween including the active and passive fiber.

5. The transponder of claim 1 further comprising additional receiver and transmitter, the additional transmitter having a second fiber laser, wherein the transmission link includes first and second fiber hauls capable of transmitting the optical supervisory signal lased by respective fiber lasers in opposite directions.

6. The transponder of claim 5, wherein the CPU is coupled to each of the receivers and transmitters and executing software which determines a direction of propagation of the optical signal upon selectively enabling one of the transmitters.

7. The transponder of claim 6 further comprising a plurality of controllers coupled to the respective receivers and each provided with software which is capable of modulating an output optical power of external fiber components, which are coupled to the respective first and second fiber hauls, in response to the optical supervisory signal received by the receiver.

8. The transponder of claim 1, wherein the CPU executes software operative to select a rate of transmission of optical supervisory signal generated by the fiber laser.

9. An ultra long-haul optical communication system for transmitting a multiplexed optical information signal at a WDM wavelength between a plurality of spaced terminal nodes in opposite directions along first and second fiber hauls, the communication system comprising:
at least one amplifying node located between each pair of the terminal nodes and coupled thereto through respective first and second fiber hauls; and
a supervisory optical channel (OSC) transmitting an optical supervisory signal (OSS) between the amplifying and adjacent terminal nodes along the fiber hauls, the OSC having a transponder located in the amplifying node and coupled to respective adjacent terminal nodes, the transponder being configured with: a central processing unit executing a software operative to receive the OSS coupled out from one of the first and second fiber hauls and compare the OSS with a reference value, and a pair of transmitting units coupled to the respective first and second fiber hauls and to the CPU, the transmitting units each having a fiber laser operative to lase the OSS with a nominal power if the OSS is at least equal to the reference value, and with an increased power greater than the nominal power if the OSS is lower than the reference value.

10. The communication system of claim 9, wherein the amplifying node is configured with Raman and erbium-doped fiber amplifier (EDFA) both coupled to the fiber haul so that the Raman amplifier is located upstream from the EDFA along a path of the multiplexed signal.

11. The communication system of claim 10, wherein the transmitting unit of the transponder lases the OSS at a wavelength different from the WDM wavelength of the multiplexed signal, the amplifying nodes each further including an output wavelength-dependent coupler coupled to the fiber haul between the Raman and EDF amplifiers and operative to couple out the OSS from the fiber haul, and an input coupler coupled to the fiber haul downstream from the EDF amplifier and to an output of the fiber laser of the transmitting unit.

12. The communication system of claim 11, wherein the transponder further includes a receiving unit coupled to the output coupler and receiving the OSS therefrom, which is representative of a magnitude of the multiplexed signal at the output of the RAMAN amplifier, the receiving unit being configured with a receiver and a controller coupled to one another, the controller being operative to switch off a pump of the Raman amplifier if the coupled out OSS is at least equal to a reference value and switch on the pump of the RAMAN if the coupled out OSS is lass than the reference value.

13. The communication system of claim 11, wherein the coupled out OSS at an output of the input coupler is up to −90 dB.

14. The communication system of claim 10, wherein the transmitting unit further includes a laser pump generating a pump light which is coupled into the fiber laser, a power of the pump light being modulated based on a controls signal from the CPU so that the fiber laser generates the OSS having one of the nominal and increased powers and coupled into the transmission link downstream from the EDF amplifier.

15. The communication system of claim 14, wherein the fiber laser is configured with active and passive fibers coupled to one another, the active and passive fibers having respective multimode and single-mode cores, the MM and SM cores being mode-matched so as to support substantially a uniform single fundamental mode of the optical signal at a desired wavelength of the OSS.

16. The communication system of claim 15, wherein the fiber laser is further configured with two reflectors coupled to the respective active and passive fibers so as to define an optical cavity therebetween including the active and passive fiber.

17. The communication system of claim 10, wherein the first and second fiber hauls, coupling adjacent nodes, each are at least 400 km long.

18. The communication system of claim 17, wherein the CPU executes software operative to process the coupled-out OSS so as to determine whether both the EDF and Raman amplifiers are out of order, and enable the transmitting unit to increase an output power of the fiber laser to a maximum value sufficient to transmit the OSS along the entire fiber haul if the EDF and Raman amplifiers are determined to be out of order.

19. The communication system of claim 9, wherein the CPU executes software operative to select a rate of transmission of the OSS in the OSC and a direction of the transmission thereof along the fiber hauls.

20. The transmission system of claim 9, wherein the CPU is a single unit common to the first and second amplifying nodes.

* * * * *